US008117106B2

(12) United States Patent
Gonen (10) Patent No.: US 8,117,106 B2
(45) Date of Patent: Feb. 14, 2012

(54) REPUTATION SCORING AND REPORTING SYSTEM

(75) Inventor: Shlomo Gonen, Calabasas, CA (US)

(73) Assignee: Telesign Corporation, Beverly Hills, CA (US)

( * ) Notice: Subject to any disclaimer, the term of this patent is extended or adjusted under 35 U.S.C. 154(b) by 227 days.

(21) Appl. No.: 12/262,019

(22) Filed: Oct. 30, 2008

(65) Prior Publication Data

US 2010/0114744 A1    May 6, 2010

(51) Int. Cl.
*G06Q 40/00* (2006.01)
(52) U.S. Cl. ................. 705/35; 705/38; 705/36; 705/37
(58) Field of Classification Search ...................... 705/35
See application file for complete search history.

(56) References Cited

U.S. PATENT DOCUMENTS

| 2003/0156707 | A1* | 8/2003 | Brown et al. | 379/265.06 |
| 2008/0109491 | A1* | 5/2008 | Gupta | 707/104.1 |
| 2008/0243920 | A1* | 10/2008 | Newman et al. | 707/104.1 |
| 2009/0070130 | A1* | 3/2009 | Sundaresan et al. | 705/1 |
| 2009/0210444 | A1* | 8/2009 | Bailey et al. | 707/103 R |

* cited by examiner

*Primary Examiner* — Ella Colbert
*Assistant Examiner* — John Anderson
(74) *Attorney, Agent, or Firm* — Kelly & Kelly, LLP (57) ABSTRACT

The reputation scoring and reporting system for accounts associated with telephone numbers and maintained in an electronic database includes processing a request for a reputation report corresponding to an account in the database. The request is authenticated via the telephone number associated with the account. A reputation report is then sent to a subscriber in response to an authenticated request. In return, transaction information between the subscriber and entity is associated with the account in the electronic database. The reputation score for the account is calculated in real-time based on the transaction information stored in the electronic database.

31 Claims, 4 Drawing Sheets

REPUTATION SCORING AND REPORTING SYSTEM

BACKGROUND OF THE INVENTION

The present invention relates to a reputation scoring and reporting system. More particularly, the invention relates to a reputation scoring and reporting system designed to identify and securely track entity reputation worldwide by telephone number.

Historically, loan officers at local banking institutions in the United States had personal relationships with individuals endeavoring to obtain a loan. The loan officer knew the credit capacity of the borrower before providing the loan. These lending practices have since been dated through the rapid growth of the financial services industry, the development of increasingly complex financial products and services, and the increase in population mobility. In turn, national centralized credit bureaus and consumer reporting agencies formed to bridge the gap between banking institutions and prospective borrowers. No longer is a personal relationship with a loan officer necessary to obtain a loan. The credit bureaus have a repository of credit history information made accessible to creditors (e.g. banks) to evaluate the credit worthiness of prospective borrowers. The credit score calculated and provided by the national credit bureaus enable creditors to ascertain the risks associated with lending money to a prospective borrower. Personal relationships with prospective borrowers are no longer needed because credit reports help predict the probability that the credit applicant will timely repay the loan.

National credit bureaus (e.g. Trans Union, Experian and Equifax) in the United States are concerned primarily with constructing credit ratings composed solely of financial history. These companies receive and store a plurality of credit history information relating to loans, credit cards and other finances. Financial history helps lenders evaluate the credit worthiness of a person endeavoring to obtain a credit line from the lender. Consequently, credit ratings are derived from a limited set of sources. In one aspect, financial sources are geographically restricted to the United States. One primary reason traditional credit bureaus have failed to expand worldwide is the inherent reliance on the social security number as a means for accumulating financial history and associating it with a particular individual. The social security number is a highly sensitive sequence of numbers that identifies a person in the United States. Other countries issue similar national identification numbers for tax and health insurance purposes, but have failed to expand its use. Hence, networks for evaluating credit history, recording credit history, and enforcing credit claims outside the United States have little or no infrastructure. The credit reporting system is, therefore, largely restricted to the United States.

Reliable national credit reporting systems are essential to the continued cost-effective availability of consumer credit in the United States. One important aspect of the national credit system in the United States is the availability of standardized credit reports. These reports contain nationally uniform data that enable banks to make credit-based decisions from remote locations. Another important aspect is that the lenders can provide prospective borrowers with loans at lower interest rates and with lower fees. Historically, obtaining credit or financial information for consumer purchases was done manually. An applicant filled out a credit request application (i.e. a loan application) by hand. The creditor then called one or more credit bureaus and filed a credit report with the corresponding credit application information. Now, most credit reporting and credit report ordering is done automatically—through the internet or over the telephone. Subscribers to the credit bureau (e.g. banks, credit card companies, etc.) automatically relay credit information regarding the prospective borrower to the credit bureaus. The credit bureaus may charge a fee for ordering a credit report on an applicant. Once the loan is granted, the subscriber may continue to report credit history, positive or negative, to one or more credit bureaus.

Absent such a national and automatic credit reporting system, lenders would necessarily pass higher costs to consumers to compensate for unknown risks associated with prospective borrowers. Thus, ready availability of accurate, up-to-date credit information from the credit bureaus benefits both creditors and consumers. Creditors can instantly measure risk while consumers obtain loans with lower fees and better rates. Credit report information also enables lenders to make credit decisions quickly, fairly and cost-effectively. On the other hand, consumers benefit from increased credit access from different sources, increased competition among lenders, and lower costs for obtaining credit. The national credit reporting system infrastructure created in the United States is an invaluable resource for creditors and prospective borrowers. Expanding the viable, national credit-reporting system to outside the United States will expand reasonable access to credit worldwide. Good financial help and access to information worldwide can better enable liquidity and financial movement throughout an international economy.

One, often overlooked aspect of credit history, is that credit reports are increasingly becoming a gauge of personal character. That is, credit reports are starting to impact consumers outside the realm of credit worthiness. In essence, credit reports are financial report cards. Principally, credit scores determine acceptance or denial of credit, application fees, and the corresponding loan interest rate. But now, more than ever, insurance companies may use credit report scores to set automobile insurance rates or health insurance rates. Persons with a poor credit history may be denied coverage or may pay higher fees or deductibles. Potential employers may even screen applicant credit reports (e.g. to inspect payment dependability) before making a job offer. Thus, there has been a growing national concern associated with identity theft and fraud due to insecure access to social security numbers and credit card accounts as credit reports increasingly become a means for personal character identification.

The three main national credit bureaus in the United States maintain approximately 1.5 billion credit accounts held by approximately 190 million individuals, receive more than two billion items of information per month, and issue roughly two million credit reports each day. Needless to say, these three credit bureaus control the major flow of financial information in the United States. The credit bureaus receive personal information from banks, credit card companies, savings associations, credit unions, finance companies, retailers, other creditors, collection agencies and other public records. Lenders also typically have an agreement or arrangement with the credit bureaus to report the financial relationship between the lender and the borrower. For example, a lender may report personal application information, payment history and revolving credit to the credit bureaus. The credit bureaus also track specific credit account information such as dates accounts are opened, credit limits, loan amounts, current balances, monthly payments and payment patterns over several years. Payment information is provided by consumer reporting agencies such as credit card or mortgage companies. Financial and non-financial information in a credit report is constantly updated based on the condition of past and current credit information.

The information collected and stored by the credit bureaus is used to calculate the credit score of the corresponding individual. Each credit bureau has a proprietary formula to calculate the credit score based on the provided information. Accordingly, the credit score is meant to measure or predict the credit worthiness of a prospective borrower. Mathematical formulas assign positive and negative weight to information in the credit history relative to the statistical evaluation of credit risk system wide. Prospective borrowers with high credit scores may immediately pre-qualify for a loan at the lowest interest rates. Other prospective borrowers having lower credit scores may receive conditional loans at less favorable rates and fees. This is commonly referred to as "risk-based" lending, which enables lenders to vary the terms of a loan (e.g. interest rate or down payment) based on the credit risk of the prospective borrower. For example, a low risk borrower is likely to be offered a lower interest rate as opposed to a borrower having a higher credit risk of default or non-payment. Risk-based pricing ultimately enables lenders to offer credit to individuals who are otherwise unqualified. Of course, the credit is offered at rates that reflect the risk.

Traditional credit reports may include credit information such as consumer identification (e.g. name, address, social security number, etc.); creditor reported credit information such as revolving credit lines (e.g. credit cards, automotive loans, mortgages, etc.); public records (e.g. bankruptcies, foreclosures, tax liens, etc.); collection agency reports (e.g. delinquent or non-payment of bills or loans); and credit record inquiries (the quantity of credit report inquiries received over a specific time). Of course, the accuracy of the credit report information is critical to national and worldwide lending. The reliance on the social security number as an identification number in the United States creates problems for the free flow of information among the number holder, the lender and the credit bureau. The current credit reporting system in the United States has major drawbacks due primarily to the sensitivity of divulging social security numbers. Social security numbers are also not available outside the United States. Moreover, the current credit reporting system inhibits accurate reporting of certain account information, minor delinquencies for everyday purchases and inconsistencies in public record data, collection agency data and credit report inquiries.

Recently, new online companies such as www.rapleaf.com and www.ratepoint.com were started to provide alternative reputation-services through the Internet. These companies endeavor to fix the deficiencies of the current credit reporting system managed by the credit bureaus. For example, Rapleaf offers personal privacy services that enable users to look up and manage personal information and privacy on the Internet. RatePoint was created to promote online and offline business quality by allowing participants to manage online reputation, thereby increasing consumer confidence. Other companies, such as eBay, provide reputation-based services to users endeavoring to purchase or exchange goods or service through that company. But, in this case, the user account is strictly limited to eBay and cannot be extrapolated to transactions outside eBay. Another overall drawback is that these online companies anchor identity to email addresses. Currently, it is easy to create a new email address if a current email address acquires a bad reputation. This allows users to constantly change identity and, consequently, remain relatively anonymous. Another drawback is that these reputation systems are not widely deployed and certainly limited to only those users who have internet access. Therefore, an international reputation-based scoring and reporting system for individuals and businesses is needed.

There exists, therefore, a significant need for a reputation scoring and reporting system deployable world-wide across an existing communication network. Such a reputation scoring and reporting system should be accessible over the phone and the internet, should identify entities with a telephone number, should increase the difficulty in remaining anonymous, should aggregate financial and personal information, should calculate a reputation score based on the financial and personal information and should be capable of enrolling anyone worldwide. The present invention fulfills these needs and provides further related advantages.

SUMMARY OF THE INVENTION

The present invention for a reputation scoring and reporting system for accounts associated with telephone numbers and maintained in an electronic database includes processing a request for a reputation report corresponding to an account in the database. The request may originate from a subscriber or other entity interested in obtaining the reputation score of the entity or entities associated with the telephone number in the account. The system authenticates the request via the telephone number associated with the account. In this regard, the authenticating step includes the step of transferring an authentication code. The authentication code is transferred by sending the authentication code to a telephone associated with the telephone number or by receiving the authentication code from the telephone itself. In the former embodiment, the sending step includes the step of calling, recording a voice-mail, or sending a text message, an SMS message or an email to the telephone. In the former embodiment, the receiving step includes the step of automatically sensing the telephone number by a caller ID system, an automatic number identification system, or a private branch exchange system. Alternatively, the authentication code may be displayed on a web page during a registration process of which the entity must send the authentication code back to the system of the present invention from the telephone.

The reputation report is then sent to a subscriber in response to an authenticated request. The reputation report is calculated in real-time and preferably includes one or more reputation scores, a fractional score, an aggregate score, or a baseline score. The report may also flag negative information therein, such as fraud, non-payment or bankruptcy. Transaction information between the entity and the subscriber is then associated with the account in the electronic database. The transaction information may include automatic numerical feedback or manual written feedback from the subscriber. The transaction information associated with the account in the database is an aggregate of transaction information among multiple subscribers. Accordingly, the reputation score should be calculated and re-calculated in real-time.

In another aspect of the reputation scoring and reporting system of the present invention, the system fields an account application, which includes the telephone number of the associated entity telephone. The system verifies the application via the provided telephone number. Subsequently, the account is formed in the database in response to a verified application. The account preferably comprises financial information and non-financial information such as peer rating, a criminal history background, a public document, or a feedback score. In another embodiment, multiple telephone numbers may be affiliated with the account for calculating the reputation score. Multiple entities may also register with a single account associated with a telephone number such that those entities contribute to the reputation score associated with the account.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
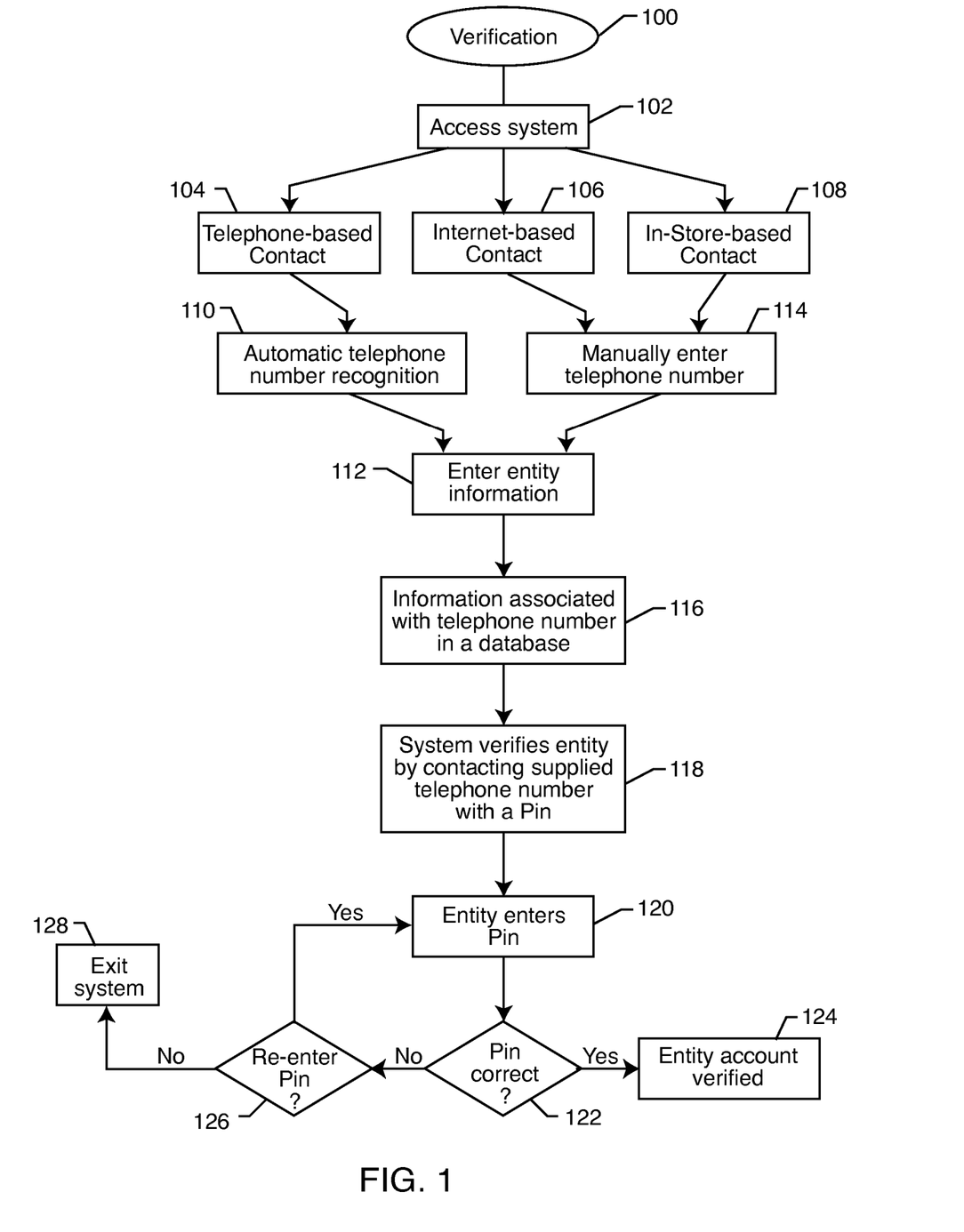
FIG. 1 is a flowchart illustrating user verification over the telephone, in accordance with the present invention.
Figure 2:
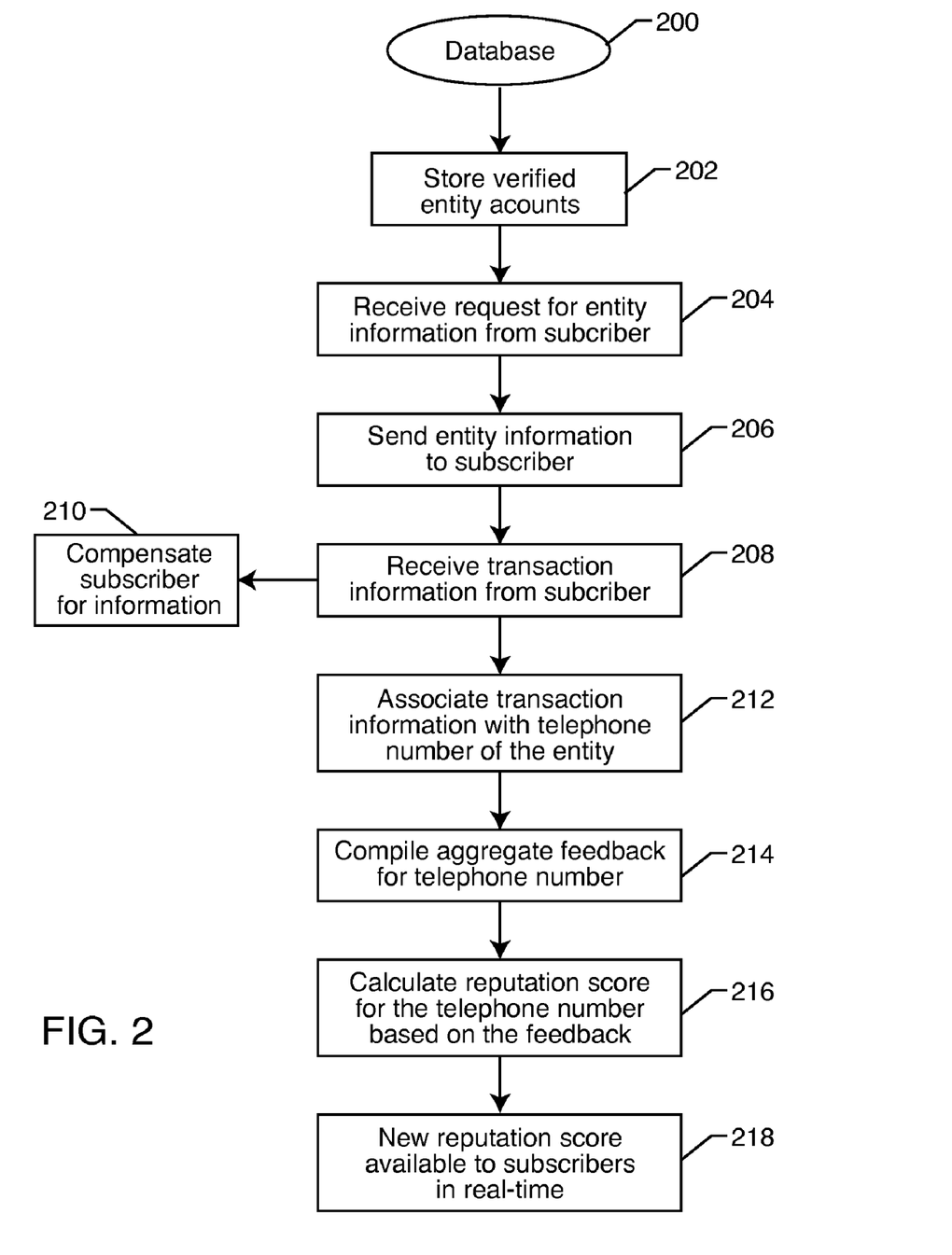
FIG. 2 is a flowchart illustrating exchange of information between a database and a subscriber.
Figure 3:
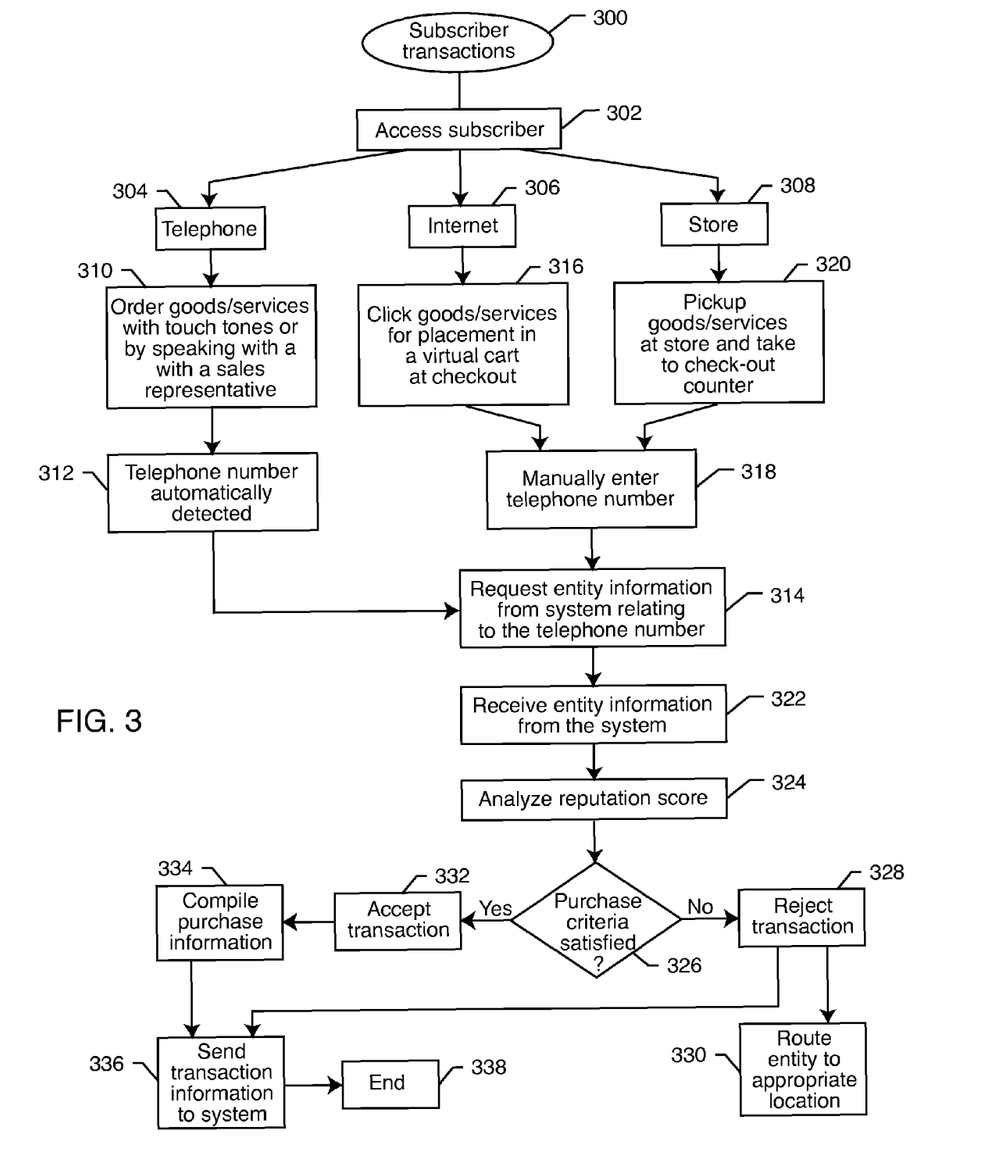
FIG. 3 is a flowchart illustrating a subscriber transaction.

As shown in the drawings for purposes of illustration, the present invention for a reputation scoring and reporting system is illustrated generally in FIGS. 1-3. The reputation scoring and reporting system of the present invention is anchored around telephone numbers. That is, similar to current practices of associating individuals with social security numbers for purposes of creating credit reports by the credit bureaus, the present invention associates a telephone number with a specific entity for creating a reputation score. In this manner, the entity may be an individual, a business, a family or any other person or group of people that have access to or use a specific telephone number. In turn, the reputation scoring and reporting system of the present invention fixes several inherent drawbacks of the current credit reporting system in the United States (i.e. those that rely solely on the social security number) and the lack of worldwide infrastructure. The use of the telephone number and telephone lines (or wireless cellular networks) immediately solves problems associated with personal or entity identification worldwide. Thus, the reputation scoring and reporting system of the present invention does not require integration of various national identification numbers of several different countries to immediately work. Besides, the various national identification numbers outside of the United States have historically been used primarily for tax purposes or health insurance. Another advantage of using telephone numbers as a means for identification in the reputation scoring and reporting system is that users do not need to disclose these highly sensitive national identification numbers, such as a social security number in the United States.

The reputation scoring and reporting system is widely deployable worldwide as users in nearly aspect of the world can communicate by telephone. Industrialized countries typically have comprehensive networks of telephone lines and other communication means. But, it is not to say that third world countries that do not have this sort of infrastructure are also left out of the present invention. Cell phone towers, even in third world countries, enable users to have remote access to telephones. In this regard, areas of the world that do not have a sufficiently developed landline telephone system are not excluded from the reputation scoring and reporting system of the present invention. Often, users in third world countries who may not have a television or computer access, oftentimes have cell phones. The present invention is compatible with both online and offline transactions. That is, a user may be verified, as described below, when purchasing an item in a traditional brick and mortar store, over the phone or at a website on the Internet. Accordingly, the reputation scoring and reporting system is not limited only to purchases over the phone. Obviously, the more companies that report reputation information, credit information and entity transactions to the system for recordation in the system database, the more information will be available to subscribers desiring to acquire the financial history and reputation of consumers. The reputation scoring and reporting system is essentially perpetual as the more information that is reported, recorded and calculated with the system, the more subscribers and consumers will want to access that information and continue to report additional information.

Telephone numbers, especially mobile or cellular numbers, are increasingly becoming a viable means of personal identification. This is due to several inherent characteristics of a mobile telephone number. First, telephone numbers are now portable. Users are no longer forced to retain telephone numbers within a geographic area of residence or business establishment. Users can port telephone numbers between cell phones and landlines, and take those numbers to different areas of the country. Second, these telephone numbers, after time, become the personal contact information for a particular entity. In this regard, users are often hesitant to cancel a telephone number and register a new telephone number because the user would risk losing communication with those who had the original telephone number, but not the new telephone number.

User telephone numbers are also certainly not anonymous. This feature of the present invention is a vast improvement over identification through the use of email addresses. It is commonplace in the Internet today for users to frequently change internet email addresses to remain anonymous. For instance, eBay users that acquire a bad reputation may decide to stop using a specific email address, open a new email address, thereby starting anew with a clean reputation. Ebay consumers have no way of knowing whether the new email address was previously associated with the old email address. Thus, it is difficult to prevent fraud in these cases. Instead, in addition to the monetary costs and "hassle" of obtaining a new telephone number, the shear logistics of constantly changing a telephone number prevents similar practices as is done with email addresses. Accordingly, new telephone numbers should be issued with no reputation history. This is similar to when a person does not have any credit history. A business must then decide whether to enter into a business transaction with a user that does not have any history associated with the telephone number. Over time, of course, the entity will build a reputation associated with the telephone number.

One aspect of the present invention is a verification process (100) as illustrated in FIG. 1. Verification (100) is a process whereby the reputation scoring and reporting system of the present invention is able to properly associate a telephone number with a specific entity. For example, the reputation scoring and reporting system could use verification means as disclosed in U.S. Publication Nos. 2006/0153346, 2006/0154661, and 2008/0010687, the contents of which each publication are herein incorporated by reference. Verification (100) can be accomplished by any of the processes disclosed in the aforementioned publications, including the general steps described below.

Verification (100) starts when a user accesses the system (102) of the present invention. The user may access the system (102) through a telephone-based contact (104), an internet-based contact (106) or through an in-store-based contact (108). Of course, the contacts (104), (106), (108) are merely preferred embodiments. A person of ordinary skill in the art will readily recognize that a user may access the system (102) by any communication means known in the art. The telephone-based contact (104) may originate from a landline telephone, a VOIP telephone connection through the Internet, a cell phone, or any other telephonic communications device. The telephone-based contact (104) may include a variety of communications such as voice communication, text message or email. Preferably, when the user accesses the system (102) via the telephone-based contact (104), the system is capable of automatic telephone number recognition (110). In this regard, the user telephone number is automatically recognized and authenticated once communication is established therebetween. Since the system of the present invention already knows the telephone number of the user, the user is prompted to enter entity information (112) thereafter.

In situations where the user accesses the system (102) via means other than a telephone-based contact (104)—such as the Internet-based contact (106) or the in-store-based contact (108), the user must manually enter the telephone number (114). Verification (100) will eventually authenticate the telephone number entered by the user in accordance with the embodiments described below. With respect to an internet-based contact (106), a user may enter a telephone number (114) into a form field on an internet web page. After manually entering a telephone number (114), the system stores the information for later verification and prompts the user to enter entity information (112). Alternatively, the in-store-based contact (108) is slightly different than the Internet-based contact (106). The in-store-based contact (108) requires the user to manually enter the telephone number (114) on a hard copy application or other transaction page to be later entered into the system by a representative of the store. In this case, the store could include any establishment endeavoring to enter into a transaction with a user, such as a bank, retailer, or other similar establishment. The manually entered telephone number (114), especially, will need to be authenticated before the user is entered to the system and database of the present invention. Of course, a manually entered telephone number (114) through the Internet-based contact (106) will be processed faster, and preferably in real-time, relative to the in-store-based contact (108).

Entering entity information (112) could include any one of a variety of information that identifies the entity. For an individual, the step of entering entity information (112) may include name, address, date of birth, email address or other contact information. A business entity may enter information (112) that includes a business address and a contact representative in charge of the company finances or reputation. Likewise, a government entity may enter information (112) that identifies a department and a corresponding department head. The entity information entered (112) is then associated with the telephone number in a database (116) managed by the system of the present invention. The system then verifies the entity (118). The verification step (118) includes any one of a variety of authentication steps, preferably those disclosed in U.S. Publication Nos. 2006/0153346, 2006/0154661 and 2008/0010687. For example, the verification step (118) could include calling the telephone number automatically recognized by the system (110) or manually entered by the consumer (114) during registration. The system of the present invention may audibly convey a pin number to the entity as part of the verification step (118). This is merely a preferred embodiment. Other means may be employed to convey the pin number to the entity, such as by text message or email. To finish registration, the user enters the pin (120) by calling the reputation scoring and reporting system, entering the information on the Internet or otherwise verifying the information in store. Preferably, the consumer enters the pin (120) into an automatic database either over the telephone or through the Internet. The system then determines whether the pin is correct (122). The entity account is verified (124) when the consumer enters a correct pin number. Alternatively, the user may be prompted to re-enter a pin number (126) after entering an incorrect pin number. The consumer may have a limited number of opportunities to enter the pin number (120) in order to verify the entity account (124). After a predetermined quantity of incorrect pin entries, the consumer is no longer offered the opportunity to re-enter the pin (126) and is instead forced to exit the system (128).

A person of ordinary skill in the art will recognize that there are many other forms of verifying the entity (118) in accordance with the present invention. For example, a user endeavoring to register with a website to purchase goods therein would initiate the Internet-based contact (106). Typically, users are prompted to enter contact information, such as name, address, billing information or shipping information. Of course, to complete registration, the user must manually enter the telephone number (114) as described above. Upon submission of the registration information, the system of the present invention contacts the entity at the supplied telephone number. In this regard, the telephone contact may be an automated telephone call placed by the system of the present invention, an automatically generated text message, SMS message or other similar text, email or voicemail message delivered to the entity telephone number. The information supplied by the system of the present invention includes the aforementioned pin or other verification number or password. The user may then enter the pin into an online registration form as part of the pin entry step (120) to verify the entity account (124). The entity is allowed to interact with the website (e.g. purchase goods) after the entity account is verified (124).

Accordingly, the present invention ensures that each transaction is associated with the correct entity by identifying an entity with a telephone number. A major problem with current reputation systems is the ability to authenticate and properly identify an entity. Currently, most websites do this by requiring an email address. But, it is easy for entities to assume a new identity by registering a new email address with any one of a number of email address providers, such as gmail, yahoo mail or hotmail. It is also fairly easy for entities to enter false or incorrect information with a new email address. It is nearly impossible to fraudulently register with the reputation scoring and reporting system of the present invention because verification is only accomplished through a telephone. Thus, entities endeavoring to engage in fraud are prevented from falsely registering with subscribers or the system of the present invention because the entity presumably does not have access to or control over the telephone with which the system requires verification.

The verification step (118) also includes verification by means other than an actual telephone call. For example, the entity may be required to send a supplied pin number via text message or SMS to a verification telephone number or text message address associated with the system of the present invention. In this regard, the entity may be supplied a pin number online after initiating the Internet-based contact (106) and entering the associated entity information (112). The entity is then required to send the text message back to the system from the telephone number supplied as part of the entity information (112). In this embodiment, the system of the present invention verifies the entity phone number by caller ID or automatic number identification (ANI) when the entity calls or sends the text message to the system telephone number. Preferably, the system telephone number is an 800 number or other toll free number that does not cost the registering entity additional money. Likewise, caller ID or ANI may be the preferred automatic telephone recognition (110) method when a telephone-based contact (104) is initiated by the entity. In this embodiment, the entity is immediately verified during telephone registration as the system of the present invention immediately verifies the originating telephone number. In another alternative embodiment of the present invention, the registering entity may receive a verification phone call in a physical store when registering via the in-store-based contact (108). The general and overriding feature of the present invention is that the reputation scoring and reporting system is able to verify registration information by providing or receiving information via a verifiable telephone number associated with and controlled by the registering entity.

The reputation scoring and reporting system of the present invention also ensures that the supplied telephone number is associated with the entity endeavoring to enter into a transaction with a subscriber. The substantial monetary and personal costs of changing telephone numbers enhances the accuracy of verification and further prevents fraud in association with the steps disclosed herein. For example, many cell phone companies require two year contracts in order to receive certain benefits such as reduced calling rates or discounted hardware purchases. Once an entity signs up for a telephone number, the telephone number cannot easily be changed, altered or otherwise dropped without paying penalties or other contract cancellation fees. Email addresses, on the other hand, are free. An entity can register a new email address within minutes and without cost. There are also the aforementioned communication and logistical problems associated with changing telephone numbers. Again, from a practicality standpoint, telephone numbers are not easily interchangeable or replaceable as are email addresses.

FIG. 2 illustrates steps for sending, receiving and compiling reputation information in a database (200) of the present invention. The accounts that are verified (100), as illustrated in FIG. 1, are stored (202) in the database (200) of the system. The accounts stored (202) are identified by telephone number. In this regard, the present invention is compatible with any telephone number available worldwide. For example, telephone numbers of entities in the United States begin with the prefix "1" and are followed by ten digits identifying the specific telephone number. Of course, other countries have different country codes and variously lengthened telephone numbers. For example, a telephone number originating in Ireland starts with the country code "353" and is followed by nine digits. The reputation score associated with the specific telephone number stored in the entity account (202) in the database (200) is specific to the individual, family, company or government agency that has access to or controls the specific telephone number. All information stored in the verified entity account (202), such as name, address, IP address, email address and reputation score are associated with the verified telephone number. In an alternative embodiment of the present invention, some information in the database (200) may not be directly associated with an entity telephone number. Privacy restrictions and other applicable local, state or federal laws may prohibit personal or private information from being directly associated with a telephone number.

A subscriber entering into a transaction with an entity may endeavor to first check the reputation score of that entity. For the purposes of the present invention, a subscriber is any person, company, government agency or other entity that provides goods or services in one form or another to entities that hold accounts with the reputation scoring and reporting system. For example, an individual (the "entity") may endeavor to obtain a loan from a mortgage company (the "subscriber") in order to purchase a house. The system of the present invention receives a request for entity information from the subscriber (204). In this regard, the mortgage company requests the reputation score of the prospective borrower from the reputation scoring and reporting system of the present invention. The reputation scoring and reporting system may first verify that the information request was previously authorized by the entity associated with the specific telephone number. This could be accomplished through any of the verification steps (100) described in relation FIG. 1. The entity may also require notification every time an information request (204) is made to the database (200). Alternatively, the entity may request notification only when specific subscribers (e.g. bank or credit card company) request information (204) on the entity. The entity may also decide not to be notified in the event that a subscriber requests information on the entity (204).

After verification, if necessary, the database (200) sends the entity information to the subscriber (206). The reputation scoring and reporting system sends any one of a number of different reputation scores with the entity information to the subscriber (206). These reputation scores are associated with the telephone number and are derived from a proprietary formula that calculates the continual aggregation of reputation history of the entity. The information associated with the entity account can be both financial and non-financial. Of course, an entity with a newly registered telephone number will not have any reputation history. At this point, the subscriber needs to determine whether or not to follow through and complete the transaction with the entity. For example, a mortgage company may have a policy against lending money to an entity that has no reputation history. The mortgage company may, alternatively, only lend the entity a certain quantity of money until the entity develops a reputation history. In turn, the database (200) receives transaction information from subscribers (208). In a preferred embodiment of the present invention, the system compensates the subscriber for the information (210). Alternatively, in return for reporting the entity information, the subscriber could receive free or reduced cost access to the database (200). In a particularly preferred embodiment, the system compensates subscribers for information (210) regarding entities that are delinquent or default on payments (so-called "bad apples"). The subscriber sending the report to the database (200) may receive payment or a credit for the report.

Moreover, entities retaining multiple telephone numbers may combine scores from each telephone number into an aggregate reputation score. That is, the reputation scoring and reporting system of the present invention is capable of associating multiple telephone numbers together with respect to one entity. Anyone with access to the telephone number can contribute to the reputation of that telephone number. For instance, anyone in a family with access to the family telephone can contribute to the reputation score of that telephone number. This might be common, for example, for a landline phone in a multiple person household. Businesses as whole may also retain reputation scores based on employee interactions with subscribers. In this embodiment, the company telephone number as a whole receives an overall reputation score based on subscriber interaction with all of the authorized employees of the company telephone number. The company may also decide to maintain separate accounts for telephone numbers specific to a particular department. In this embodiment, the reputation score associated with the department telephone number is determined by subscriber interaction with only those employees within that particular department.

Transaction information received from the subscriber (208) is associated with the telephone number of the entity (212). Reputation history for that telephone number accumulates as the behavior of the entity is continually updated by subscribers reporting the results of transactions completed with that particular entity. The subscriber may submit to the database (200) a transaction report detailing transaction information with the entity. A first part of the report may include a means for automatically providing feedback. In this embodiment, the subscriber may numerically rate the entity in several prescribed performance categories. The subscriber may submit this information over the telephone, through the Internet or through paper submission. Preferably, the subscriber submits the automated feedback online for real-time processing. A second form of feedback could include written notations or other supplemental information explaining the transaction with the entity. The written notations could also describe the numerical scores entered during the automated feedback step. Preferably, the written notations are entered into a web page form compatible with the database (200) for automatic submission along with the numerical feedback. In an alternative embodiment, the written notations may be audibly conveyed to the database (200) over the telephone. Here, voice recognition software may record spoken notations for association with the entity in the database (200). Of course, the submission of reputation information (numerical, written or spoken) could be done manually or automatically.

The actual format of the feedback score can be in a variety of forms. For example, feedback scores could be based on a structured format indicating a positive, a negative or a neutral result. The subscriber may also submit other information regarding the transaction, such as fraud. Moreover, the subscriber may modify or change the details of the transaction in real-time. For example, a seller registers with an online classifieds website and posts a classified advertisement that defrauds the buyer. The classifieds website submits negative feedback to the reputation scoring and reporting system regarding the actions of the seller. Of course, the negative feedback is associated with the telephone number of the seller. If it turns out that the buyer lied about being defrauded by the seller, the online classifieds company could submit a new report to the reputation scoring and reporting system changing the previous information submitted. In this case, the seller is cleared of any negative score submitted to the reputation scoring and reporting system regarding the fraud charges. A corresponding negative score could be submitted to the account of the buyer. A person of ordinary skill in the art will readily recognize that this is merely one example embodiment of submitting and/or changing reputation information stored in the database (200). In the previous example, non-financial information is submitted to the database (200) for association with the telephone number of the entity (212). The database (200) may store, send and receive a plurality of information that describes or records a transaction with an entity.

The database (200) further compiles aggregate feedback for the telephone number (214). The compiled information is used to calculate the reputation score for the telephone number based on the feedback (216). Preferably, the reputation score is in a range of 200-800. Alternatively, the reputation score could include other numerical or non-numerical information. Such information might include a percentage of positive feedback relative to the total feedback. Alternatively, the reputation score may include a percentage of positive and neutral feedback relative to the total quantity of feedback. In another alternative embodiment, the reputation score may be provided as an aggregate of positive feedback minus negative feedback. In another aspect of the present invention, the reputation score may be provided as a compilation of feedback within a specific duration, such as six months or a year. The feedback ratings may also be provided by the type of transaction (e.g. mortgages, credit cards, retail, etc.), quantity of the transaction, or nature of the feedback. A person of ordinary skill in the art will readily recognize that any of the information in the database (200) is easily sortable and can be provided to the subscriber in any one of a variety of different forms.

The methodology for calculating the reputation score of the telephone number based on the feedback (216) could take into account the nature of the underlying transactions, the severity of negative transactions, and other methods that ensure that the reputation score effectively captures the reputation history of the entity. A proprietary formula used with the reputation scoring and reporting system may give a larger deference to negative transactions involving criminal actions relative to negative transactions for late payment, non-payment or default, for example. This aspect of the reputation scoring and reporting system endeavors to capture both financial and non-financial information otherwise not captured in the current credit reporting system in the United States. Entities convicted of crimes for fraud or stealing money carry an inherently higher loan risk than those entities with no criminal record. Current credit report systems are not adequately equipped to report these transactions to the credit bureaus. The present invention, however, enables subscribers to submit a wide range of information, including negative behavior such as fraud or stealing, to the database (200) for inclusion in the feedback score. The subscriber may submit other less severe, but still negative transactions such as "late payment" or "customer was belligerent". Written notations may also be considered in the proprietary formula after manual review. This aspect of the present invention endeavors to more accurately denote each individual transaction and the associated feedback score. Ultimately, the underlying aspect of the present invention is the association of transaction reputation by telephone number with a specific entity to more accurately represent risks associated with engaging in a transaction with that entity. Of course, this has common applications in buying, selling, renting and lending, just to name a few.

The new reputation score calculated by the reputation scoring and reporting system is then available to subscribers in real-time (218). The calculated reputation score (216) is constantly updated as new information from subscribers is added therein. In a preferred embodiment in the present invention, the reputation score is calculated (216) with each update of the verified entity account (202) in the database (200).

FIG. 3 illustrates a sample embodiment of a subscriber transaction (300). First, the entity accesses the subscriber (302). In one example, accessing the subscriber (302) may occur over a telephone (304), over the Internet (306) or in-store (308). Of course, like accessing the system (102), accessing the subscriber (302) may be accomplished by any communication means known in the art. When initiating telephone access (304), the entity orders goods and/or services using touch tones or by speaking with a sales representative (310). The entity telephone number is automatically detected (312) according to any of the above-described embodiments. For example, the telephone number may be automatically detected (312) by caller ID or ANI. After verification, the subscriber is able to request entity information from the system relating to the verified telephone number (314). In a similar sequence leading up to requesting entity information (314), an entity accessing the subscriber (302) through the internet (306) clicks on goods and/or services for placement in a virtual cart at check out (316). An entity that has not previously registered with the website must manually enter the telephone number (318) during registration. Likewise, an entity accessing the subscriber (302) in-store (308) may pick up goods and/or services within the store for purchase at a check-out counter (320). In this embodiment, the entity may similarly manually enter the telephone number (318) so that the subscriber may request entity information from the database (200) relating to the detected or entered telephone number (314). The database (200) processes the request and sends the corresponding entity information back to the subscriber. In this step, the subscriber receives the entity information from the system (322). The system of the present invention may first verify the entity before providing the entity information to the subscriber. An unregistered entity must first register with the system. Verification (100) of the entity occurs as described above.

Information is supplied to the subscriber electronically. Preferably, the information is provided by SOAP, a protocol used for exchanging XML-messages over computer networks. But, a person of ordinary skill in the art will readily recognize that information may be exchanged between the subscriber and the system of the present invention by any means known in the art. The received entity information (322) may include the entity name, address, city, state, zip code, marketing preferences and any one of a number of reputation scores, including a raw score, a fractional score or a feedback score. Of course, more or less information may be supplied by the system. For example, the quantity of supplied information may vary by subscriber, entity, applicable law regulating the dissemination of information, or any other criteria set forth by the system, subscriber or entity.

Figure 4:
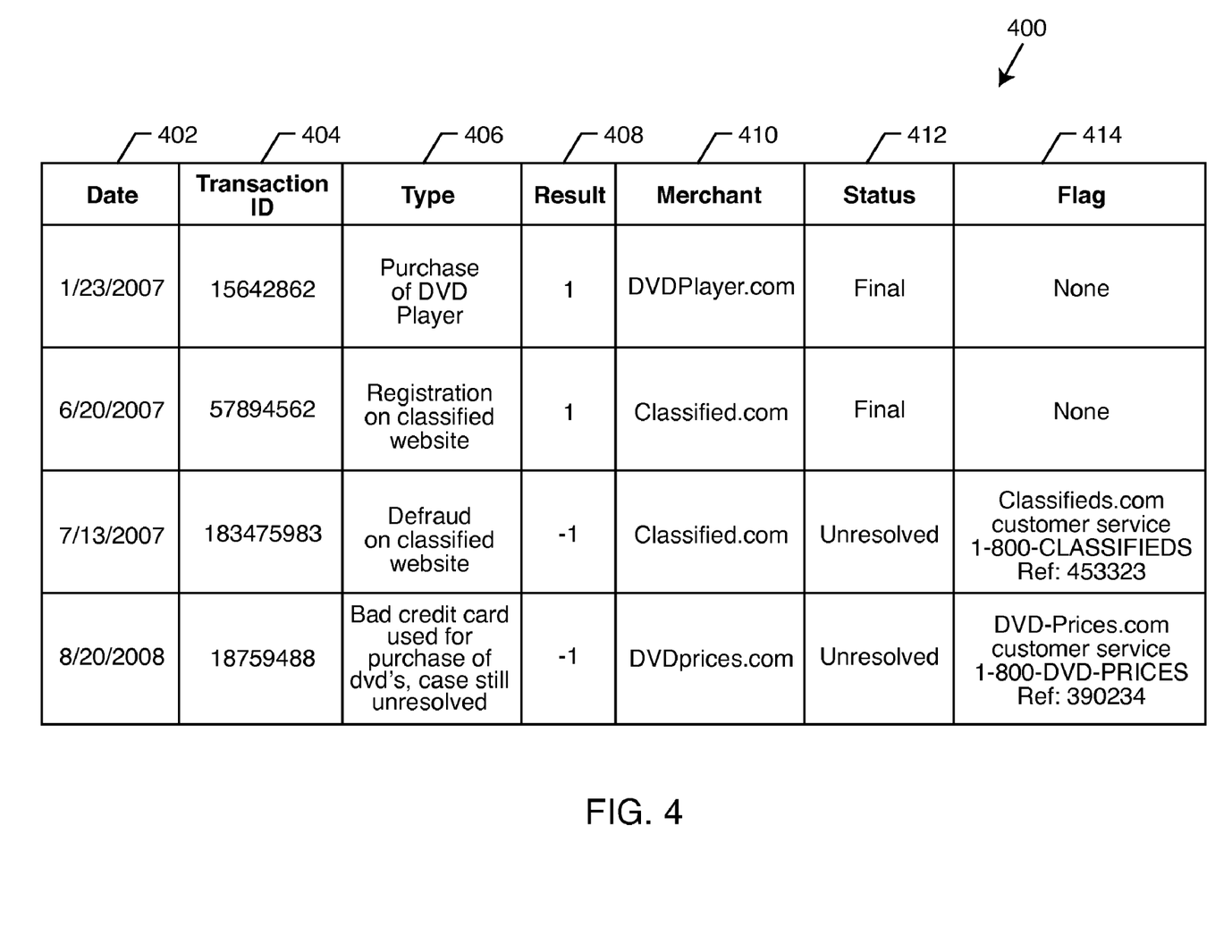
FIG. 4 is a sample chart of a consumer report.

FIG. 4 illustrates a sample embodiment of a report 400 in accordance with the present invention. The report 400 may include a variety of information. As shown in FIG. 4, the report 400 includes a date column 402, a transaction ID column 404, a type of transaction column 406, a result column 408, a merchant column 410, a status column 412, and a flag column 414. The columns 402, 404, 406, 408, 410, 412, 414 are exemplary of the type of information that should be included with the report 400. This is not to mean that the report 400 has to include each of the aforementioned columns. The report 400 could include more columns, less columns or a variety of the previously described columns. The date column 402 provides the date of the transaction. This enables the subscriber and/or entity to clearly identify when a transaction occurred. Of course, the date column 402 may be provided in any format and the chart itself may be organized according to any of the aforementioned columns 402, 404, 406, 408, 410, 412, 414. The date column 402 may also further include the time of day that the transaction occurred. Next, the transaction ID column 404 is an internal reference number for the reputation scoring and reporting system of the present invention. This enables the subscriber to make inquiries to the system regarding the particulars of a specific entity transaction. The transaction ID column 404 also enables an entity to contact a merchant (see the merchant column 410) with a reference number. This is handy when the entity endeavors to resolve negative feedback. The merchant may easily identify the transaction with the system by means of the transaction ID number.

The type of transaction column 406 provides a description of the transaction between the entity and the subscriber. As shown in FIG. 4, the type of transaction column 406 may have information that includes purchases, registrations, fraud or other information such as use of a bad credit card. The corresponding result column 408 displays numerical feedback provided by the merchant regarding the type of transaction. Such feedback may include a positive number for positive feedback, a zero for neutral feedback or a negative number for negative feedback. The result column 408 shown in FIG. 4 includes two positive feedback scores (i.e. denoted by "1") and two negative feedback scores (i.e. denoted by "−1"). The number in the result column 408 may vary depending upon the severity of the transaction. For example, a mortgage company may have the option to provide a positive result in the result column 408 between the numbers one and five. In this embodiment, if the mortgage company had no problems or very few problems with the prospective borrower during the application process, the mortgage company may endeavor to highly regard the entity thereby providing a five in the result column 408. In this type of scoring, it is preferable that a midpoint number, such as three in the above example, be the average experience of the subscriber with the entity.

Moreover, the merchant column 410 identifies the merchant (i.e. DVDPlayer.com or Classified.com). The merchant column 410 may additionally include contact information for the merchant such as an address, telephone number or web site. The status column 412 lists the status of the transaction. As shown, the first two transactions are final and considered resolved. Accordingly, there are no flags in the flag column 414. The latter two rows include fraud and bad use of a credit card, as identified in the type of transaction column 406. These items are both unresolved as noted in the status column 412. The entity accordingly received a negative feedback score (i.e. a "−1") in the result column 408. The flag column 414 provides contact information for the merchant in order for the entity to resolve the negative status of the transaction. This provides the entity a quick and viable means of rectifying negative feedback on the report 400. As shown in the flag column 414, a reference number may also be included with the customer service contact information therein.

The subscriber uses the report 400 to analyze the reputation score (324), as shown in FIG. 3, of the entity endeavoring to enter into a transaction with the subscriber. The subscriber may account for one or more of the criteria set forth in the report 400 obtained as part of receiving step (322). The reputation score associated with the report 400 may include an internal score (i.e. reputation score) calculated by the reputation scoring and reporting system of the present invention, a fraction or percentage of positive, neutral and negative feedback, a combination of such feedback, or a baseline notation for determining whether the entity has any outstanding unresolved flags. For example, an entity may have previously entered into one hundred transactions with subscribers. The report 400 would detail the content associated with those transactions, including the aforementioned information, in any combination thereof. As part of the report 400, the system may convey the reputation scoring and reporting reputation score, the fractional score, the feedback score or the baseline serious flag outstanding notation. In this particular example, assume that the entity received fifty-one positive feedback marks, forty-eight neutral feedback marks and one negative feedback mark. As described above, the reputation scoring and reporting system will calculate a reputation score (preferably within the range of 200-800) regarding the number of transactions and the quality of the feedback. In this regard, the entity may have a reputation score of 700, a positive/neutral fraction score of 99/100, an aggregate positive feedback score of 50 and one "serious flag outstanding" notation. The reputation score may be calculated based any proprietary formula developed by the reputation scoring and reporting system of the present invention. Such a score may consider one or more of the items listed in the report 400. The fractional score comprises the aggregate positive and neutral results divided by the total transactions. In this case, the entity received ninety-nine positive and neutral results and one negative result. Likewise, the aggregate positive feedback score equals the total positive feedback results subtracted by the total negative feedback results (i.e. 51−1=50). Of course, the entity has one "serious flag outstanding" notation on the report 400.

The subscriber may choose to analyze the reputation score (324) by any method desirable to the business of the subscriber. Accordingly, the subscriber may take into consideration one or more of the scores provided by the system of the present invention. The subscriber may also have an independent formula for determining whether the purchase criteria is satisfied (326). Ultimately, the reputation score is based on a proprietary algorithm unique to the reputation scoring and reporting system that accounts for the quantity of entity transactions, the types of transactions, the financial information regarding the transactions, the nature of the transactions and any associated fraud or disputes associated with the transactions. Moreover, the "serious flag outstanding" may be delivered and analyzed as a "yes" or "no" baseline notation. In this regard, a subscriber may immediately reject a transaction (328) and route the entity to an appropriate location (330) if the entity has a single "serious flag outstanding". The subscriber may have a policy for refusing to do business with any entity that has a serious flag outstanding. The subscriber may route the entity (330) to a welcome page, a product page or another place external to the subscriber. Of course, the subscriber may have different criteria for entering into a transaction with an entity based on the information supplied in the report 400. For example, the subscriber may reject a transaction (328) when an entity endeavors to purchase an expensive item, yet accept a transaction (332) when the same entity endeavors to purchase a cheaper product. The purchase criteria (326) may also require that the entity have a certain reputation score (i.e. above 475), a certain positive/neutral fraction (i.e. above 85%) or a total feedback score (i.e. above 50) before entering into a transaction with the entity. Each subscriber may independently determine the criteria for rejecting (328) or accepting (332) a transaction.

After accepting a transaction (332), the subscriber compiles the purchase information (334) for transmission back to the database (200). The step of compiling purchase information (334) could include any variety of products or services offered by the subscriber. For example, purchase information may include goods (e.g. automobile, home furnishings, groceries, etc.) or services (e.g. mortgages, medical care, etc.). The subscriber compiles information on the entity, such as a row of information illustrated in the report 400 in FIG. 4. Once the transaction is complete, either after compiling purchase information (334) or after rejecting the transaction (328), the subscriber sends the transaction information to the database (200) of the present invention (336). The details of the transaction are relayed to the system and associated with the telephone number of the entity. This enables the subscriber to send transaction information (336) instantaneously and automatically. This method of reporting is particularly ideal for entities that access the subscriber (302) by telephone (304) or over the Internet (306). The transaction information may be sent (336) via a SOAP host. A person of ordinary skill in art will readily recognize that the transaction information may be sent from a subscriber to the reputation scoring and reporting system by any viable means known in the art. Preferably, the information is communicated over a secure or encrypted communication network. The information may be sent in a variety of different formats compatible with the system of the present invention. Of course, the information should include at least a numerical score or a set of category ratings. Written notations may be optional.

In one example of the present invention, the subscriber sends transaction information to the system (336) for a guitar purchase over the Internet. The initial information relayed to the reputation scoring and reporting system is the telephone country code and the telephone number of the purchaser. The country code is a number that associates the telephone number of the entity with a particular country. Every country has a different country code and may have varying means for assigning telephone numbers within that country. The telephone number, of course, is the number associated with the telephone of the purchaser. Other information sent by the subscriber may include purchaser name (i.e. first and last name) and address (i.e. street, city, state, zip code and country). The name and address may be updated in the database (200) as transactions are added to the entity account. This allows the database (200) to account for additions, deletions, changes, corrections or typos in real-time. Additional names may be added to the entity account as members associated with the telephone number become involved in transactions with subscribers. For example, a family that uses a landline telephone may have multiple names associated with the telephone number.

The subscriber should return some form of a feedback score to the reputation scoring and reporting system, even if the subscriber rejected the transaction (328). In a particularly preferred embodiment of the present invention, a "+1" means that the transaction had a positive result, a "0" means that the transaction had a neutral result and a "−1" means that the transaction had a negative result. Assuming that the subscriber did not have any problems with the entity, the subscriber should at least issue a feedback score of "0". A "−1" means that the subscriber had problems with the entity at some point in the transaction. For example, the subscriber may issue a negative result in the event that the subscriber rejects the transaction (328) of the entity. The subscriber may also relay the type of transaction into which the subscriber entered with the entity. A categorization code may identify the type of transaction. For example, an e-commerce registration and purchase may fall into code or group "38". Other types of transactions may include classifieds, social networking or other purchases that require group membership. Preferably, the subscriber reports the amount of money or the monetary value exchanged with the entity for the goods or services. The subscriber may also provide marketing information such as the type and quantity of product purchased by the entity. Optionally, the subscriber may add a text description of the transaction. The description may be automatically generated or manually entered by a customer service representative. For example, the subscriber may automatically relay information to the reputation scoring and reporting system that the entity used a credit card to purchase the guitar. Specifically, for purchases over the telephone (304), a customer service representative may include notes regarding the transaction, such as the demeanor of the entity. In this example, the subscriber would not send transaction information to the system (336) with a flag identifying the status as being unresolved. Flags are only intended when the entity commits fraud, fails to pay for the goods or services transacted for with the subscriber, or otherwise commits some other serious violation. The transaction ends (338) after the subscriber information is sent to the system (336). The reputation scoring and reporting system associates the information received from the subscriber with the entity according to the telephone number provided. The system files the information with the specified telephone number and calculates a new reputation score for the entity telephone number. The information update occurs in real-time.

The subscriber may also be equipped to notify the entity of the reasons for being rejected (328) during the transaction. For example, the entity may be notified that the provided telephone number does not have a corresponding reputation score high enough to enable the entity to purchase the desired goods and/or services. The entity may, alternatively, be informed that the rejection (328) occurred because of an outstanding flag or other unresolved prior transaction. As shown in FIG. 4, the entity identified with the telephone number of the report 400 includes two unresolved transactions in the status column 412. The subscriber, equipped with the information in the report 400, may provide to the entity the unresolved transactions that must first be reconciled before the subscriber will transact with the entity. The subscriber may provide the entity with contact information of the appropriate customer service department as identified in the flag column 414. If the entity resolves the outstanding flags shown in the report 400, the corresponding subscriber (e.g. Classifieds.com or DVD-Prices.com) may update the transaction information with the reputation scoring and reporting system of the present invention. In one embodiment, the updated report 400 may identify that there was a flag, but that now the flag has been resolved in view actions taken by the entity. Alternatively, the flag may be removed from the report 400 altogether. The system then updates the entity score identified with the particular telephone number. Accordingly, some flags may be more difficult to remove than other flags. For example, if the entity engages in fraud or other criminal acts, the system may choose to leave such negative feedback on the report 400 for a certain duration, such as five years. In the event that an entity defrauds a subscriber of the present invention, the system may notify past subscribers that recently transacted with the entity of such fraud. This feature endeavors to slow down and even stop the rate of fraud occurring through anonymous transactions.

For accessing a subscriber (302) with a telephone (304), the system of the present invention may authenticate the telephone number according to the previously described processes. These methods of authentication are particularly ideal for single sign-on applications. Rather than filling out long and laborious forms, the entity simply enters a telephone number into a website, clicks submit and goes through the above-described steps for verifying the telephone number. By doing this, the system is capable of authenticating the registration of the entity and transferring relevant entity information to the subscriber. In this application, the entity is capable of side stepping any form filling. The subscriber is capable of immediately identifying the pertinent details of the entity endeavoring to enter into a transaction with the subscriber. All the relevant information associated with the telephone number is provided to the subscriber by the system of the present invention, as described above. The subscriber instantly has an in-depth reputation history of the entity. The entity, meanwhile, saves valuable time by only filling out one registration form when initially setting up an account with the reputation scoring and reporting system of the present invention. Only an entity with access to the inputted telephone number can complete the transaction. Thus, without access to the telephone number, fraud is nearly impossible. The single sign-on application may also be combined with a user name and password when an entity accesses a subscriber (302) over the Internet (306).

In another aspect of accessing a subscriber (302) with the telephone (304), is that corporate entities may have private branch exchange systems (PBX) in place that can immediately recognize a telephone number through caller ID. Information stored in the database (200) may be coupled to the PBX systems to quickly complete transactions. For example, an entity calls 1-800-FLOWERS to access a subscriber (302) over the telephone (304). The entity endeavors to order goods and services (310), such as a bouquet. The PBX system automatically detects the telephone number (312) and requests entity information (314) from the system. After receiving the entity information (322), the subscriber analyzes the reputation score (324) and determines that the purchase criteria (326) is satisfied. In fact, this particular entity has a reputation score that is extremely high and indicates that the entity has spent significant quantities of money in recent transactions. Equipped with this information, the subscriber may route this particular entity to the head of a wait line or immediately route the entity to a preferred customer service representative.

In an alternative embodiment, an entity calls 1-800-CAR-PARTS to order an alternator. The subscriber analyzes (322) the reputation score (324) provided by the reputation scoring and reporting system only to find out that the entity has an overdue invoice with another merchant. Instead of connecting the entity with a customer service representative, the subscriber may reject the transaction (328) and convey information related to rectifying the flag on the entity report 400. In a particularly preferred embodiment of the present invention, the subscriber immediately routes the entity to the collection department (330) for the merchant identifying the outstanding flag. The entity needs to settle the unresolved flag before being able to enter into a transaction with the 1-800-CAR-PARTS subscriber. The only way to circumvent the reputation scoring and reporting system is to obtain a new telephone number—a cumbersome process that has its own pitfalls as described above.

In another aspect of the present invention, it is possible to tie the database (200) into other databases, such as subscriber databases, credit reporting databases or entity databases. This allows information obtained in the system to aggregate among multiple sources. For example, other databases may have entity marketing information, address and location information, credit information, etc. Combining the databases and ultimately the information therein enables subscribers to access additional information that may improve business profits. The more information at hand, the better decision the subscriber may make when entering into a transaction with the particular entity. Accordingly, the reputation score can be used by both online and offline subscribers.

The reputation scoring and reporting system of the present invention is a solution for forming a credit network worldwide. This is based on the premise that telephone numbers are increasingly becoming a form of identification for individuals, families, businesses, government and other entities. Hence, a comprehensive reputation report regarding transactions between the entity and subscribers centers on the telephone number. Increasing the quantity of information delivered to the subscriber at the time of the transaction effectively minimizes fraud, harm to users, risks in lending, etc. Informed decisions promulgate efficient transactions. Reputation information is current and accurate, updated easily and done in real-time to ensure that subscribers are provided with the most accurate and up-to-date information. Subscribers may also set up automated queries and automated rules for determining whether to enter into a transaction with a particular entity associated with a telephone number. For example, a subscriber can set up rules to automatically approve transactions with an entity that has a reputation score greater than a predetermined threshold. The subscriber may also manually approve transactions that are greater than a predefined reputation score floor but less than the threshold for automatically accepting transactions. In another aspect of the present invention, the subscriber may immediately reject a transaction of an entity having a reputation score less than the predefined reputation score floor.

Ultimately, cell phones are becoming a viable means of identity. With that, entities are capable of doing much more with telephone and cell phone accounts. For example, entities are capable making payments, accessing the Internet and operating applications from a cell phone. Moreover, cell phones are easily deployable worldwide. In this regard, a developing country does not need an intricate network of interconnected telephone landlines to deploy the reputation scoring and reporting system of the present invention. Instead, numerous cell phone towers may be interspersed in various regions of the country where users may receive access. Entities further tend to retain cell phone numbers because of the ease or portability. Especially in the United States, cell phone numbers may be "ported" to and from various carriers. Likewise, landline telephone numbers may be "ported" to cell phones. Using a telephone number as a means of identification is also particularly ideal for countries that do not have an intricate network of recordkeeping for citizens, an equivalent to the social security number in the United States. Thus, it would be possible for a farmer in the middle of a remote third world country to obtain a business loan from a bank in a relatively distant and commercialized metropolitan city because the bank would be capable of accessing the farmer's complete reputation history through the system of the present invention. The bank immediately knows the reputation of the farmer based on the reputation score in the associated reputation report. Of course, the farmer may verify the transaction through the use of the cell phone.

The system may also collect other entity information such as demographics, social economic status, age, income, sex, education, occupation, purchasing habits, etc. This information may be sold or used in marketing and advertising to generate additional income, in accordance with the present invention.

Although several embodiments have been described in detail for purposes of illustration, various modifications may be made to each without departing from the scope and spirit of the invention. Accordingly, the invention is not to be limited, except as by the appended claims.

What is claimed is:

1. A reputation scoring and reporting system for accounts associated with telephone numbers and maintained in an electronic database, comprising the steps of:
 processing a request for a reputation report corresponding to an account in the database previously authenticated via the telephone number associated with the account;
 sending the reputation report to a subscriber in response to the request;
 associating transaction information with the account in the electronic database; and
 recalculating a reputation score for the account.

2. The system of claim 1, wherein the authenticating step includes the step of transferring an authentication code.

3. The system of claim 2, wherein the transferring step includes the step of sending the authentication code to a telephone associated with the telephone number or receiving the authentication code from the telephone.

4. The system of claim 3, wherein the sending step includes the step of calling, recording a voicemail, or sending a text message, an SMS message or an email to the telephone.

5. The system of claim 1, wherein the authenticating step includes the step of automatically sensing the telephone number by a caller ID system, an automatic number identification system, or a private branch exchange system.

6. The system of claim 2, wherein the transferring step includes the step of displaying the authentication code on a webpage.

7. The system of claim 1, including the steps of:
 fielding an account application, the application including a telephone number;
 authenticating the application via the telephone number associated with the account;
 forming the account in the database in response to the authenticated application.

8. The system of claim 1, including the step of flagging negative information in the reputation report.

9. The system of claim 1, including the step of affiliating multiple telephone numbers with the account for calculating the reputation score.

10. The system of claim 1, including recalculating the reputation score in real-time.

11. The system of claim 1, wherein the transaction information comprises automatic numerical feedback or manual written feedback.

12. The system of claim 1, wherein the reputation report comprises a reputation score, a fractional score, an aggregate score, or a baseline score.

13. The system of claim 1, wherein the account comprises financial information or non-financial information.

14. The system of claim 13, wherein the non-financial information comprises a peer rating, a criminal history background, a public document, or a feedback score.

15. The system of claim 1, including the step of aggregating transaction information in the account from multiple subscribers.

16. The system of claim 1, including the step of registering a plurality of entities with the account associated with the telephone number.

17. The system of claim 1, wherein the reputation score for the account is recalculated based only on information obtained from subscribers.

18. A reputation scoring and reporting system for accounts associated with telephone numbers and maintained in an electronic database, comprising the steps of:
 fielding an account application, the application including a telephone number;
 authenticating the application via the telephone number including the step of transmitting an authentication code to a telephone associated with the telephone number or receiving the authentication code from the telephone or automatically sensing the telephone number by a caller ID system, an automatic number identification system, or a private branch exchange system;
 forming the account in the database in response to an authenticated application;
 processing a request for a reputation report corresponding to the account in the database;
 sending the reputation report to a subscriber in response to the request;
 associating transaction information with the account in the electronic database; and
 recalculating a reputation score for the account.

19. The system of claim 18, wherein the transmitting step includes the step of calling, recording a voicemail, or sending a text message, an SMS message or an email to the telephone.

20. The system of claim 18, wherein the authenticating step includes the step of displaying the authentication code on a webpage.

21. The system of claim 18, including the step of flagging negative information in the reputation report.

22. The system of claim 18, including the step of affiliating multiple telephone numbers with the account for calculating the reputation score.

23. The system of claim 18, including recalculating the reputation score in real-time.

24. The system of claim 18, wherein the transaction information comprises automatic numerical feedback or manual written feedback.

25. The system of claim 18, wherein the reputation report comprises a reputation score, a fractional score, an aggregate score, or a baseline score.

26. The system of claim 18, wherein the account comprises financial information or non-financial information.

27. The system of claim 26, wherein the non-financial information comprises a peer rating, a criminal history background, a public document, or a feedback score.

28. The system of claim 18, including the step of aggregating transaction information in the account from multiple subscribers.

29. The system of claim 18, wherein the reputation score for the account is recalculated based only on information obtained from subscribers.

30. A reputation scoring and reporting system for accounts associated with telephone numbers and maintained in an electronic database, comprising the steps of:

fielding an account application, the application including a telephone number;

authenticating the application via the telephone number by transmitting the authentication code to a telephone by calling, recording a voicemail, or sending a text message, an SMS message or an email to a telephone associated with the telephone number, or receiving the authentication code from the telephone, or automatically sensing the telephone number by a caller ID system, an automatic number identification system, or a private branch exchange system;

forming the account in the database in response to an authenticated application, wherein the account comprises financial information or non-financial information;

processing a request for a reputation report corresponding to the account in the database;

sending the reputation report to a subscriber in response to the request;

flagging negative information in the reputation report;

associating transaction information with the account in the electronic database, wherein the transaction information comprises automatic numerical feedback or manual written feedback; and recalculating a reputation score for the account in real-time.

31. The system of claim 30, wherein the reputation score for the account is recalculated based only on the automatic numerical feedback or manual written feedback obtained from subscribers.

\* \* \* \* \*